May 7, 1968     H. V. LILLIN     3,382,235
CONCENTRATING VISCOUS SOLUTIONS OF MACROMOLECULAR SUBSTANCES
Filed May 27, 1965
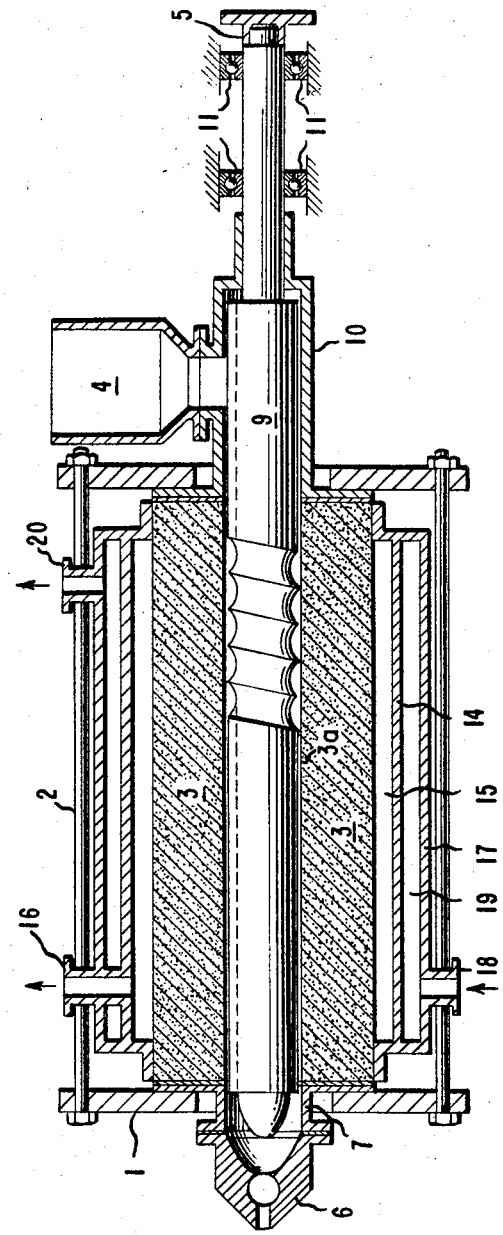
INVENTOR
HEINRICH V. LILLIN
BY *Samuel S. Blight*
ATTORNEY United States Patent Office 3,382,235
Patented May 7, 1968

3,382,235
CONCENTRATING VISCOUS SOLUTIONS OF MACROMOLECULAR SUBSTANCES
Heinrich V. Lillin, Neu-Isenburg, Germany, assignor to E. I. du Pont de Nemours and Company, Wilmington, Del., a corporation of Delaware
Filed May 27, 1965, Ser. No. 459,183
1 Claim. (Cl. 260—230)

ABSTRACT OF THE DISCLOSURE

Solutions of polymers in volatile solvents are concentrated by bringing the solution in contact with a porous wall and withdrawing a portion of the volatile solvent through the porous wall.

---

This invention relates to the concentration of viscous solutions of macromolecular substances in volatile solvents.

Macromolecular substances such as cellulose esters, polystyrene, polyvinyl or polyacrylic derivatives or the like are dissolved in a suitable volatile solvent or in a corresponding solvent blend for the manufacture of foils, filaments and the like, and these solutions are then converted to filament, foil or like form, e.g., by means of a spinneret or a casting device. The solvent employed for dissolving the material is removed by evaporation after casting or spinning.

It is desirable to employ casting or spinning solutions having the highest possible concentration of macromolecules for these highly concentrated solutions permit faster production rates and minimize solvent loss. In very high viscosity solutions, the solution process proceeds very slowly, and after the solution is completed undesirable solids material, e.g., dust, undissolved macromolecules, and merely swollen particles of macromolecules, must be removed, for example, by filtration, since these impurities would have deleterious effects on the properties of the finished materials. Usually filtration of the viscous solution is conducted under pressure, but at elevated pressures the filter pores tend to bleed and blind. If a dilute solution is filtered under substantially atmospheric pressure, and then concentrated by standard procedures, e.g., distillation, air bubbles are formed in the solution and the solutions tend to form zones of inhomogeneity with respect to concentration and viscosity. Of course, these air bubbles must be removed before the material can be satisfactorily processed which leads to additional difficulties.

The present invention is realized by bringing the solution to be concentrated into contact with one side of a porous wall which is permeable only to the solvent vapor, which wall is maintained at a temperature higher than that of the solution to be concentrated, while the opposite side of the wall is subjected to a reduced pressure as compared to the pressure of the solution thereby permitting the solution to be concentrated as the vapor passes through the wall. As an alternative to heating the porous wall, energy may be supplied to the solution by mechanical means, e.g., a standard type of stirrer, to prevent super-cooling during concentration.

The porous material employed in the present invention and applicable to the apparatus described hereinbelow should have an average pore volume of 40 to 60 percent and an average pore diameter of 1 to 60 microns. Examples of suitable materials are porous clay pipe, cermets, sintered iron, sintered polytetrafluoroethylene, sintered polypropene, and the like materials. The porous material should be selected so that its porosity is fully retained in the concentrating operation and it is not attacked by the solvents employed. Examples of materials which may be concentrated in accordance with the present invention are cellulose esters, polyacrylates, polymethacrylates, polystyrene, polyvinylacetate and polycarbonates, etc. Solvents operable in the present invention include acetone, methylene chloride, benzene chloroform, tetrahydrofuran, carbon disulfide, hydrocarbons, alcohols, or blends of the aforementioned solvents.

A more complete understanding of the present invention may be had by reference to the drawing attached hereto and made a part of this specification wherein the drawing shows a plan cross section of a concentrating apparatus. The apparatus consists of a conveying means embodying a hopper 4 arranged to discharge onto a conveying screw 9 which screw is driven by coupling 5 through bearing 11 and is maintained in proper alignment by casing 10. A cylindrical porous membrane 3 is axially aligned with conveyor screw 9, the inner surface 3a of which is in close proximity to the screw. A solvent removal means is shown in the drawing as a jacket 14 which permits the application of vacuum to the inner space 15 via connection 16. A means is also illustrated to supply energy to the solution via jacket 17 which permits the introduction of a suitable heating fluid through inlet 18 into space 19 thence through exit 20. Alternatively, the energy may be supplied by mechanical action of the conveying screw 9. A discharge means comprising a nozzle 6 and spacer 7 are provided to direct the discharge of the concentrated solution after passage through the device. The discharge nozzle is joined to the main body of the apparatus by flanges 1 and bolts 2. A brief description of the operation of the apparatus follows.

A dilute solution is charged to feed hopper 4 and is picked up by conveying screw 9 and forced through porous membrane 3. A vacuum (20–100 Hg) is applied in space 15 causing the volatile solvent to be drawn through the porous membrane, thus effecting a concentration of the solution which then would be discharged through nozzle 6. Water or other suitable heating material is supplied to space 19 to permit warming of the porous membrane and prevent supercooling of the solution being concentrated.

The following examples are presented to illustrate and not to restrict the present process.

EXAMPLE 1

Approximately 100 grams of a solution composed of 15.2 percent by weight cellulose triacetate, 2.3 percent by weight triphenyl phosphate, 75 percent by weight methylene chloride and 7.5 percent by weight methanol is charged to a clay pipe having an average pore volume of 48 percent. The initial viscosity of the solution is 380 poises. The outer surface of the clay pipe is fitted with a concentric double jacket, in the inner enclosed space of which a vacuum of 30 torr is maintained by means of a vacuum pump. A liquid heated to 35° C. is directed through the outer enclosed space. An activated carbon receiver retains the solvent which is drawn off. The contents of the clay pipe are kept in motion by a radial stirrer and after 15 minutes, 40 grams of solvent is drawn off. This solution now exhibits a total solids content of 28.5 percent and exhibits a total solids content of 28.5 percent and exhibits a viscosity of 6000 poises which represents a 15.8 fold increase over the viscosity of the initial solution. This concentrated solution is completely free from bubbles and foreign solids and can easily be formed into a flat shape by passage through a slit under slight pressure onto a suitable support.

EXAMPLE 2

A standard type of conveyor worm driven by a suitable motor is surrounded by a cylinder consisting of a porous sintered material. The cylinder is wound with several turns of thin tubing embedded in a layer of glass wool and the entire assembly is surrounded by a jacket to seal the cylinder and windings. The feed orifice for the solution to be concentrated is situated in the cylinder at the driven end of the worm. The jacket forming the air-tight seal is connected to a vacuum pump and a liquid heated at 50° C. flows through the tube-winding. At the discharge end of the cylinder, there is an orifice in the form of a slit from which the solution may be directed to a suitable support in flat form. A solution containing 1700 grams of cellulose acetate (56.3 percent acetic acid) and 7100 grams of acetone is charged to the aforementioned feed hopper. The viscosity of this solution is 410 poises. The drive worm is activated and the liquid is forced through the apparatus by the worm screw. The solution discharged from the apparatus lost 40 percent by weight of solvent resulting in a solution containing 31.5 percent by weight of cellulose acetate and the viscosity of the solution had risen 6.8 fold to 2780 poises. The solution is free from bubbles and gelation and can be cast flawlessly into a foil.

I claim:
1. A process for the preparation of a concentrated solution of organic polymers in normally volatile solvents which consists of contacting a relatively dilute starting solution of an organic polymer in a normally volatile solvent with one surface of a porous wall, said wall having a pore volume of 40 to 60 percent and an average pore diameter in the range 1 to 60 microns, said wall being readily permeable only to the vapors of said solvent, maintaining said wall at a temperature greater than that of said dilute solution, maintaining the surface of said wall opposite to the point of contact of said dilute solution at a pressure lower than that of said solution, thereby effecting the removal of a selected amount of said solvent and thereafter recovering a concentrated solution of said organic polymer as compared to said starting solution.

References Cited

UNITED STATES PATENTS 3,156,009  11/1964  Alsys _____ 159—2
3,217,783  11/1965  Rodenacker _____ 159—2
3,211,209  10/1965  Latinen et al. _____ 159—2

DONALD E. CZAJA, *Primary Examiner.*

R. W. MULCAHY, *Assistant Examiner.*